US012251734B2

(12) United States Patent
Moran et al.

(10) Patent No.: US 12,251,734 B2
(45) **Date of Patent: *Mar. 18, 2025**

(54) INTEGRATED ON-DEMAND PLACARDING

(71) Applicant: United States Postal Service, Washington, DC (US)

(72) Inventors: Robert Charles Moran, Crofton, MD (US); Marlon Guy Wells, Fort Washington, MD (US)

(73) Assignee: United States Postal Service, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/391,444

(22) Filed: Dec. 20, 2023

(65) Prior Publication Data

US 2024/0116080 A1 Apr. 11, 2024

Related U.S. Application Data

(63) Continuation of application No. 18/178,344, filed on Mar. 3, 2023, now Pat. No. 11,883,853, which is a continuation of application No. 17/031,541, filed on Sep. 24, 2020, now Pat. No. 11,602,774.

(60) Provisional application No. 62/905,617, filed on Sep. 25, 2019.

(51) Int. Cl.

| | |
|---|---|
| ***B07C 3/14*** | (2006.01) |
| ***B07C 3/18*** | (2006.01) |
| ***B07C 3/20*** | (2006.01) |

(52) U.S. Cl.

CPC .................. *B07C 3/14* (2013.01); *B07C 3/18* (2013.01); *B07C 3/20* (2013.01)

(58) Field of Classification Search

CPC .... B07C 3/14; B07C 3/18; B07C 3/20; B07C 3/008; B07C 5/3404

See application file for complete search history.

(56) References Cited

U.S. PATENT DOCUMENTS

| | | | | |
|---|---|---|---|---|
| 4,688,678 | A | 8/1987 | Zue et al. | |
| 5,419,457 | A | 5/1995 | Ross et al. | |
| 6,208,910 | B1 * | 3/2001 | Michael | G07B 17/00024 700/229 |
| 6,561,339 | B1 | 5/2003 | Olson et al. | |
| 6,724,308 | B2 * | 4/2004 | Nicholson | G08B 13/2414 340/572.1 |
| 6,801,833 | B2 * | 10/2004 | Pintsov | B07C 3/18 700/229 |
| 6,953,906 | B2 | 10/2005 | Burns et al. | |
| 7,284,699 | B2 | 10/2007 | Hamilton | |
| 7,341,186 | B2 | 3/2008 | Mrozik et al. | |
| 8,340,814 | B2 | 12/2012 | Hamilton | |
| 9,317,823 | B2 | 4/2016 | Muirhead | |
| 10,576,621 | B2 | 3/2020 | Wagner et al. | |
| 10,611,021 | B2 | 4/2020 | Wagner et al. | |
| 10,692,405 | B2 | 6/2020 | Bonnell | |
| 10,758,943 | B1 | 9/2020 | Carpenter | |
| 11,390,463 | B1 | 7/2022 | Stone et al. | |

(Continued)

*Primary Examiner* — Patrick H Mackey

(74) *Attorney, Agent, or Firm* — Knobbe, Martens, Olson & Bear, LLP

(57) ABSTRACT

This disclosure relates to systems and methods of integrated on-demand labeling of item containers. In particular, this disclosure relates systems and methods for automatically creating and using placards to label, track, and organize item containers and items.

18 Claims, 14 Drawing Sheets

(56) References Cited

U.S. PATENT DOCUMENTS

| | | | | |
|---|---|---|---|---|
| 11,602,774 | B2 * | 3/2023 | Moran | B07C 3/14 |
| 11,883,853 | B2 * | 1/2024 | Moran | B07C 3/18 |
| 2006/0108266 | A1 * | 5/2006 | Bowers | B07C 3/00 209/584 |
| 2018/0273296 | A1 | 9/2018 | Wagner et al. | |
| 2021/0008597 | A1 | 1/2021 | Grupp et al. | |
| 2021/0009362 | A1 | 1/2021 | Grupp et al. | |
| 2021/0086234 | A1 | 3/2021 | Moran et al. | |

* cited by examiner

INTEGRATED ON-DEMAND PLACARDING

INCORPORATION BY REFERENCE

Any and all applications for which a foreign or domestic priority claim is identified in the Application Data Sheet as filed with the present application are hereby incorporated by reference under 37 C.F.R. § 1.57. This application is a continuation of U.S. application Ser. No. 18/178,344, filed Mar. 3, 2023, which is a continuation of U.S. application Ser. No. 17/031,541, now U.S. Pat. No. 11,602,774, filed Sep. 24, 2020, which claims the benefit of priority to U.S. provisional application 62/905,617, filed Sep. 25, 2019, the entire contents of which are hereby incorporated by reference.

BACKGROUND

This disclosure relates to systems and methods of on-demand placarding in a distribution network. In particular, this disclosure relates systems and methods for automatically creating and using placarding to label, track, and organize item containers and items.

SUMMARY

Methods and apparatuses or devices disclosed herein each have several aspects, no single one of which is solely responsible for its desirable attributes. Without limiting the scope of this disclosure, for example, as expressed by the claims which follow, its more prominent features will now be discussed briefly. After considering this discussion, and particularly after reading the section entitled “Detailed Description” one will understand how the described features provide advantages that include towing and connections.

In some embodiments, a method is disclosed for tracking items in a distribution network. The method can include placing a first item container at a bin of a processing machine. The method can include generating a first placard, wherein the first placard comprises a radio-frequency identification (RFID) tag. The method can include applying the first placard to the item container. The method can include generating a first assign event assigning the first placard to the first item container. The method can include storing, in a memory, the assign event. The method can include sorting items to the bin and item container of the processing machine such that items are directed into the item container. The method can include determining, in a processor, that the item container is full of items. The method can include generating, in response to determining the item container is full of items, a second placard. The method can include generating a close event for the first placard. The method can include storing, in the memory, the close event for the first placard. The method can include placing a second item container in the bin. The method can include generating a second assign event, assigning the second placard to the second item container.

In some embodiments, the method can include maneuvering the first item container having the first placard thereon through a vestibule with an RFID reader such that the RFID tag of the first placard interacts with the RFID reader. The method can include generating a stage scan event. The method can include associating, in the memory, the stage scan event with the items in the first item container.

In some embodiments, the method can include maneuvering the first item container having the first placard thereon on to a transportation vehicle through a portal having an RFID reader that interacts with the RFID tag of the first placard. The method can include generating a load scan event, indicating that the first item container has been loaded onto the transportation vehicle at an origin facility.

In some embodiments, the method can include maneuvering the first item container from the transportation vehicle such that a second RFID reader interacts with the RFID tag of the placard. The method can include generating an unload scan event indicating that the item container with the applied placard has been unloaded from the transportation vehicle at a destination facility.

In some embodiments, the RFID tag can include a unique identifier. The method can include updating, in an item database, item records for items sorted to the first item container to include the unique identifier of the RFID tag of the first placard.

In some embodiments, the first placard can include unique identifying information, origin facility information, and destination information.

In some embodiments, the first placard comprises data including a bin number, network destination, unique code, sort program identification, sort machine type, item category, ZIP Code™ range, trip information, sequence number, and/or network origin.

In some embodiments, a method is disclosed of tracking distribution items. The method can include placing an item container at a bin of a processing machine, the item container can have a unique computer readable identifier thereon. The method can include creating, via a processor, placard information for the item container, the placard information can include a computer readable code and destination information. The method can include associating, in a memory, the unique computer readable identifier of the item container with the computer readable code of the placard information. The method can include sorting items to the bin of the processing machine such that items can be directed into the item container. The method can include generating a closed event when the item container is full or sortation of items by the processing machine. The method can include associating the closed event with the unique computer readable identifier of the item container. The method can include scanning, via a reader, the computer readable identifier on the item container. The method can include querying the memory to identify destination information for the item container based on the scanned computer readable identifier. The method can include directing the item container to a destination within a distribution facility according to the destination information.

In some embodiments, the unique computer readable identifier can be an RFID tag.

In some embodiments, associating the closed event with the unique computer readable identifier of the item container can include associating item identifiers for items in the item container with the unique computer readable identifier of the item container and with the computer readable code in the placard information.

In some embodiments, a system of tracking items in a distribution network is disclosed. The system can include an item processing machine having a plurality of bins, each bin being able to receive one or more item containers. The item processing machine can sort items to the plurality of bins and to an item container at each of the plurality of bins. The system can include a processor in communication with the item processing machine. The processor can generate a first placard, wherein the first placard includes a radio-frequency identification (RFID) tag and placard information. The first placard can be attached to a first one of the plurality of item containers. The processor can generate a first assign event assigning the first placard to one of the plurality of bins and to the first item container of the plurality of item containers. The processor can store, in a memory, the first assign event and an association between the bin the first item container located at the first bin, and the first placard. The processor can determine that the item container is full of items. The processor can generate, in response to determining the item container is full of items, a second placard. The second placard can include a radio-frequency identification (RFID) tag and placard information. The second placard can be attached to a second one of the plurality of item containers. The processor can generate a close event for the first placard. The processor can store, in the memory, the close event for the first placard. The processor can generate a second assign event, assigning the second placard to the second item container.

In some embodiments, the placard information of the first placard and of the second placard can include destination information.

In some embodiments, the destination information of the first placard can include the same information as the destination information for the second placard.

In some embodiments, the system can include a vestibule having an RFID reader positioned at a determined location in a distribution facility. The processor can detect the RFID tag of the first placard when the first item container moves through the vestibule. The processor can generate a scan event based on the detection. The processor can identify the location of the vestibule within the distribution facility. The processor can store, in the memory, a type of scan event for the first item container, the type of scan event can be based on the identified location of the vestibule within the distribution facility.

In some embodiments, the vestibule can be located at a transition between a processing area and a dock area of the distribution facility. The type of scan event can be a stage scan event.

In some embodiments, the processor can determine a previous location of the item container by querying the memory to identify a previous scan event for the item container. The processor can determine the type of scan event based on the location of the vestibule within the facility and the previous stored scan even for the item container.

In some embodiments, the RFID tag of the first placard can include a unique identifier. The processor can update, in an item database, item records for items sorted to the first item container to include the unique identifier of the RFID tag of the first placard.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

DETAILED DESCRIPTION

Figure 1:
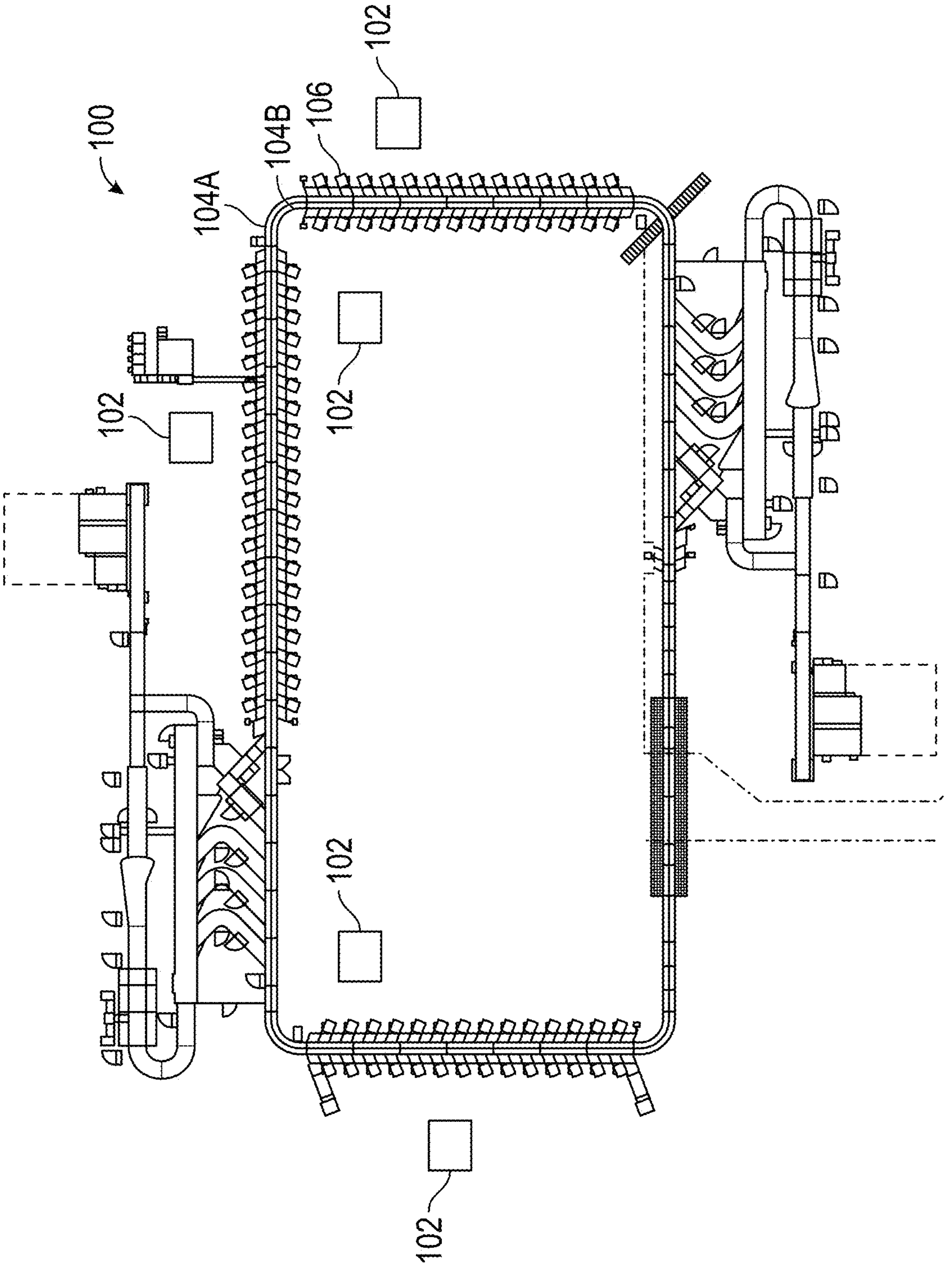
FIG. 1 schematically illustrates an embodiment of a processing machine with printers.

Methods and apparatuses or devices disclosed herein each have several aspects, no single one of which is solely responsible for its desirable attributes. Without limiting the scope of this disclosure, for example, as expressed by the claims which follow, its more prominent features will now be discussed.

In the following detailed description, reference is made to the accompanying drawings, which form a part thereof. In the drawings, similar symbols typically identify similar components, unless context dictates otherwise. Thus, in some embodiments, part numbers may be used for similar components in multiple figures, or part numbers may vary depending from figure to figure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and made part of this disclosure.

The quantity of items being handled by logistics systems, for example, by distribution networks, is rising. Items referred to herein may be mailpieces, such as letters, magazines, flats, packages, parcels, etc.; luggage; cargo; boxes; pallets; etc.; or any other item of inventory which is transported or delivered in a distribution system or network. The term item may also refer to a unit or object which is configured to hold one or more individual items, such as a container which holds multiple letters, magazines, boxes, etc. The term item may also include any object, container, storage area, rack, tray, truck, train car, airplane, or other similar device into which items or articles may be inserted and subsequently transported, as are commonly used in distribution systems and networks.

Operators in distribution facilities can manually create placards with route and destination information for moving items, containers, rolling stock, and the like within a facility and between facilities. However, with dynamic routes, schedules, items, and other variables in a distribution network, manually creating placards can result in operators not utilizing up-to-date information. This can result in inefficiencies and errors, which can require operators to print additional placards. This can result in wasted time, work-hours, facility space, and in errors.

The movement of item containers, and any items therein, can be tracked by manually indicating events on placards or manually scanning placards. Placards with item information and/or destination information thereon are attached to containers, rolling stock, delivery resources, etc. The placards are used to track the containers to which they are attached, and are used to determine destinations for the containers to which they are attached. For example, operators use the placard to determine the intended destination for the container, and can manually indicate on the placard or manually scan the placard when the item container is closed, moved, loaded onto a trailer for shipment, and/or other handling events. Manually indicating or scanning events, however, can lead to missed event records, errors, and inefficiency.

Embodiments of the integrated on-demand placarding (IODP) disclosed herein can advantageously increase efficiency, reduce errors, and remedy problems in a distribution network, including, for example, the problems articulated above. The IODP system automatically generates placards by sourcing different databases that have up-to-date route, schedule, item, and/or other information, ensuring that placards have up-to-date information. The IODP system prints placards in an organized manner to printers strategically positioned around item processing equipment, such as mail processing equipment (MPE), processing machines, or other types of equipment, to improve efficiency and organization. This can reduce the likelihood that an operator will need to print additional placards, resulting in a reduction of waste and errors, and improve efficiency and accuracy in item processing. In some embodiments, the printers are portable, enabling an operator to advantageously carry the portable printer around a facility to print at any location. Placards can be labels that are applied to item containers. Placards can have many forms, and can be a piece of paper, an adhesive label, a plastic or rigid material which resists bending and damage during normal use and transportation, an adhesive label, etc.

Some exemplary IODP systems and methods described herein include placards with radio-frequency identification (RFID) tags to automatically generate scan event records for the movement of item containers upon which one or more placards are positioned. For example, RFID readers are strategically positioned within a sortation facility, such as at a dock door, so that the RFID readers interact with the RFID tag of a placard. The RFID reader automatically communicates the interaction to a surface visibility database such that the "load" scan event or other handling event is recorded. This advantageously reduces the likelihood of missed recorded events, errors, and inefficiencies.

FIG. 1 schematically illustrates an exemplary processing machine or automated package processing system (APPS) 100 that is used to sort items, such as parcels, packages, envelopes, bags, and/or boxes. The processing equipment 100 sorts items to a plurality of individual bins 106 that are positioned around the processing equipment 100. The processing equipment 100 includes an outer conveyor 104A and inner conveyor 104B that move and direct items to the plurality of bins 106. The plurality of bins 106 can include item containers such as bags, baskets, trays, boxes, pallets, or other types of item containers, such that the items sorted to a bin 106 are contained within an item container—advantageously enabling the group movement of the binned items for improved efficiency and organization. Printers 102 are strategically located around the processing equipment 100 enabling operators to conveniently retrieve printed placards 200, described in reference to FIG. 2, and to apply or couple the placards to the bins 106. In some embodiments, printers 102 can be portable printers that can attach to and/or be carried by an operator, such as a hip printer. This can advantageously enable an operator to print a placard 200 at any position. The placard 200 printed from a portable printer 102 can be a reduced size compared to a placard 200 printed from a printer 102 that is not portable. The processing equipment 100 can include scanners, sensors, readers, and/or cameras to detect items, shipping labels, placards (including RFID tags), and/or other objects.

Figure 2:
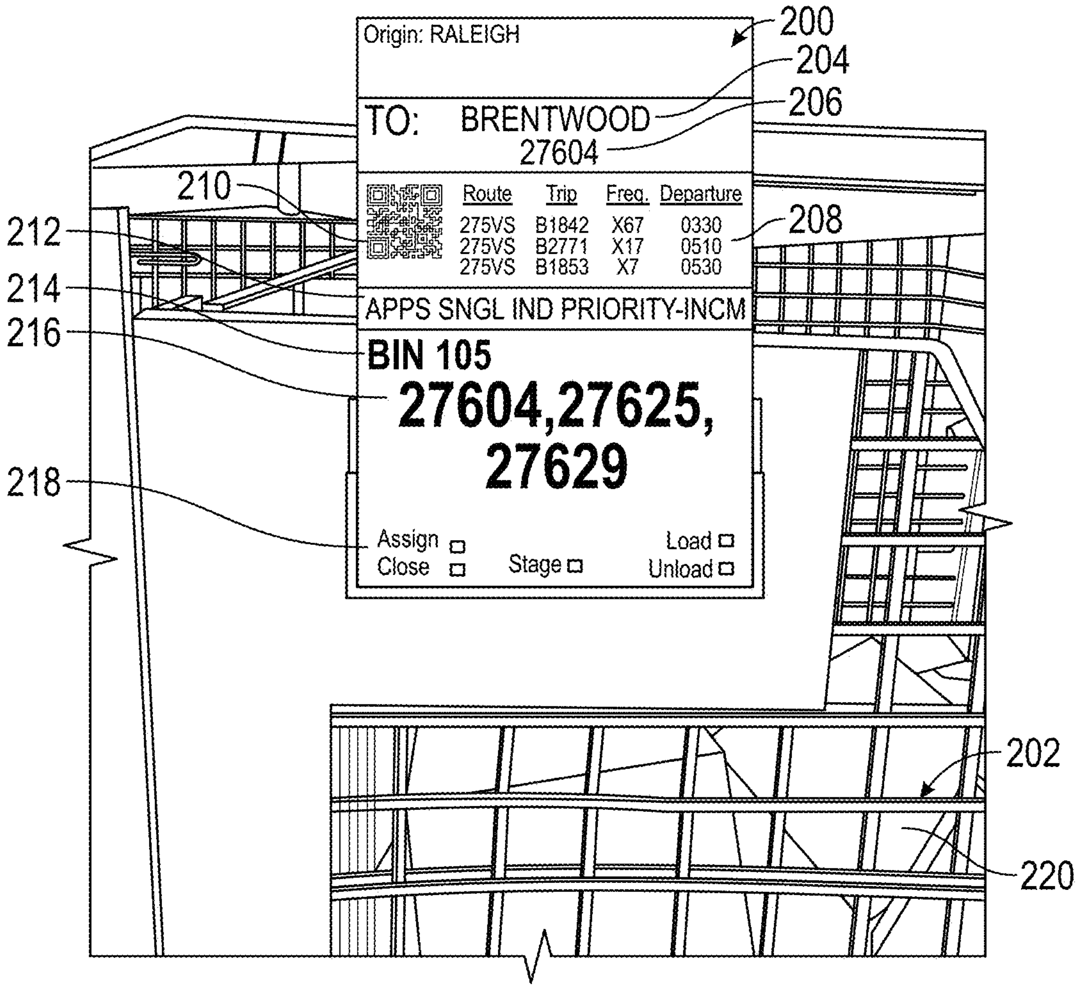
FIG. 2 illustrates an embodiment of a placard coupled to an exemplary item container.

As illustrated in FIG. 2, the placard 200 generated by the printers 102 can be coupled, attached, or otherwise applied to an item container 202 that is adapted to receive items 220. The item container 202 depicted in FIG. 2 is a wire sided container, or wiretainer. It will be understood that item containers 202 described herein can be of a variety of types and form factors without departing from the scope of the disclosure. The placard 200 indicates information regarding the shipment of the item container 202 and items 220. The placard 200 includes a container-destination name 204 and/or container-destination code 206, such as a ZIP Code™ to which the item container 202 is to be transported. In some aspects, the placard 200 includes a regional code that encompasses the container-destination code 206. The placard 200 includes route information 208, which can include route numbers, trip numbers, frequency, departure times, and/or other information. The placard 200 includes an item category 212 that indicates the category of items 220 that are contained in the item container 202 to which the placard 200 is coupled, such as priority and/or other categories. The placard 200 includes a bin number 214 that indicates a bin 106 location of the processing equipment 100 with which the placard 200 was associated during sortation, as described herein. The placard 200 includes item codes 216 that indicate the destination of items 220 in the item container 202. The item codes 216 can include one, two, three, four, or more separate codes. The item codes 216 can correspond to, for example, ZIP Codes™, to which the items 220 are intended for delivery. Accordingly, the container-destination code 206 can indicate the location of a destination sortation facility while the item codes 216 can indicate the final destination ZIP Codes™ of the items 220. In some aspects, the item code 216 is a range of codes or regional codes, such as the first 3 digits of a ZIP Code™.

The placard 200 can include event boxes 218 where an operator can check that an event has occurred, such as assign, close, stage, load, unload, and/or other events described herein. In some aspects, event boxes 218 can be omitted from the placard 200 where handling events for the item container are automatically recorded in a database described elsewhere herein. The placard 200 includes a QR code or barcode 210, which can be associated with information detailed above and/or other information, such that scanning the QR code or barcode 210 enables a system described herein to recognize the scanned QR code or barcode 210 of the placard 200 that is associated with the data detailed above. In some embodiments, the barcode 210 can be a passive or active tag, such as an RFID tag. The QR code or barcode 210 can be scanned by a camera or sensor to recognize and/or read the placard 200. In some aspects, the QR code or barcode 210 can be manually scanned to generate a scan event. The placard 200 can also include via points, distribution requirements, regional codes, and/or other information.

In some embodiments, the placard 200 can include a tag (not shown). The tag can be a radio-frequency identification (RFID) tag, or other type of tag having a unique identifier. In some aspects, a tag is coupled to, embedded in, and/or otherwise associated with the placard 200. The tag of the placard 200 is unique to the placard 200, such that an individual placard 200 can be identified among a plurality of placards 200 or items 220. The tag of the placard 200 is readable by sorting equipment, mail processing equipment (MPE), and/or readers—enabling the placard 200 to be quickly and efficiently recognized. The tag of the placard 200 can be active, passive, or semi-passive. In some aspects, Wi-Fi, Bluetooth, GPS, near field communication (NFC), electromagnetic fields, and/or other methods can be used to enable the placard 200 and/or tag of the placard 200 to be tracked, organized, associated with a bin 106 and/or item 220, and/or disassociated with a bin 106 and/or item 220.

The placard 200 can be a variety of colors. In some aspects, the placard 200 is a color that is conveniently seen by operators during sortation, such as red, orange, yellow, green and/or other eye-catching colors. In some aspects, the placard 200 is a muted color, such as brown, gray, and/or other colors.

Figure 3:
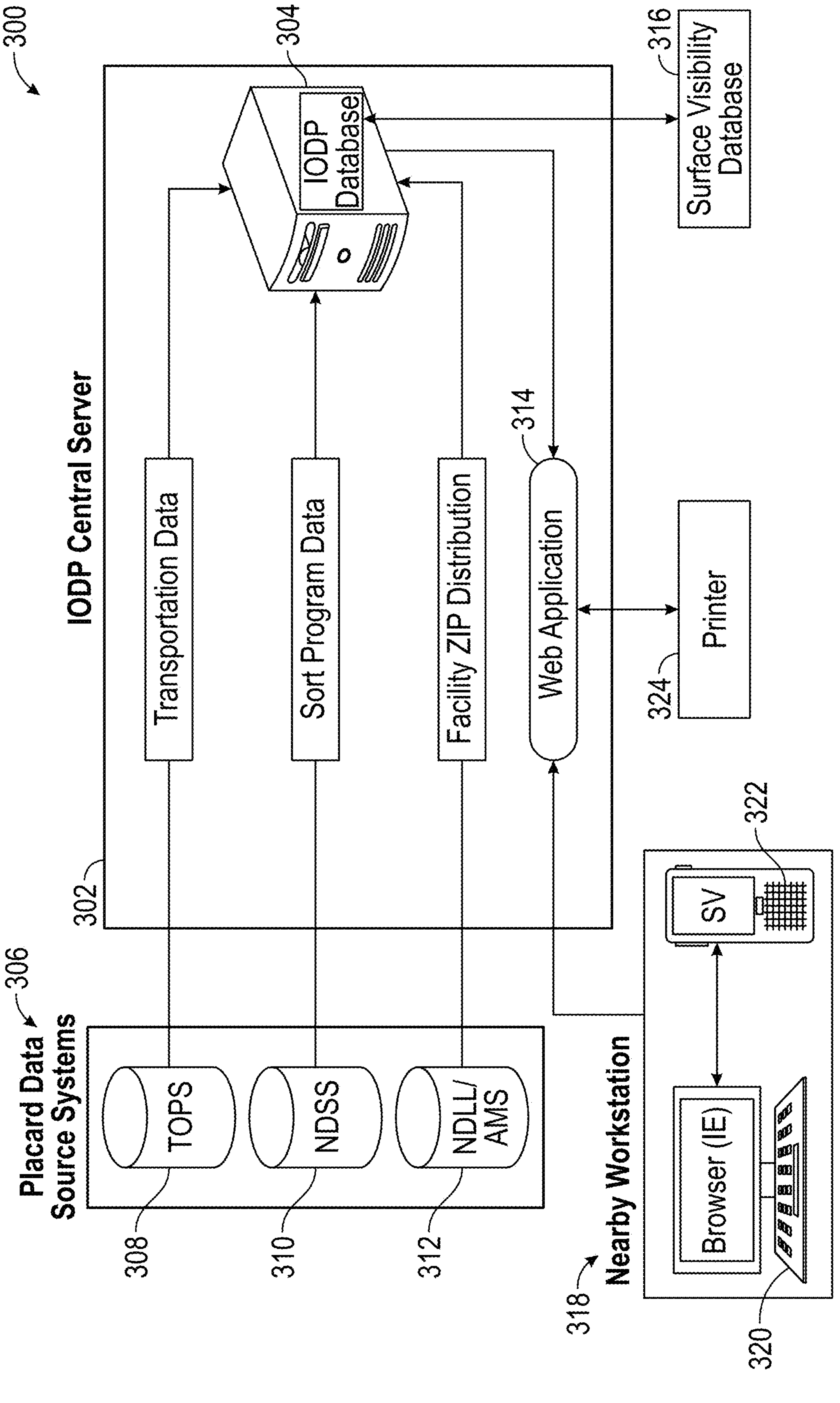
FIG. 3 schematically illustrates an exemplary integrated on-demand placarding (IODP) system.

The placards 200 are automatically created by the integrated on-demand placarding (IODP) system 300, as shown in FIG. 3. The IODP system 300 has an IODP central server 302 that has an IODP database 304. In some embodiments, the IODP database 304 can be part of the server 302, or can be a remotely accessed database, distributed database, and the like. The arrangement of the components, connections, and features, of the IODP system 300 is exemplary. The IODP database 304 receives, manipulates, and stores data from placard data source systems 306, which can include data from a transportation database 308, sort program database 310, and/or facility or address management system database 312. The transportation database 308 provides the IODP database 304 with scheduled transportation routes, route numbers, trip numbers, frequency of trips/routes, departure times, and/or other information for vehicles, containers, etc. within a distribution network. The routes can be between facilities, such as sorting, processing, and/or delivery facilities in a distribution network.

The sort program database 310 provides the IODP database 304 with the latest sort programs as they are updated. A sort program or sort plan can be prepared for each facility each day, for each piece of item processing equipment within a facility each day, or at another desired interval. The sort plan can identify incoming item volume using an actual volume or an estimated volume, and can schedule the item processing equipment for one or more various tasks, such as sortation to a particular region or to another processing plant, for processing a type of item, or based on any other desired criteria. A sort plan can include a list of destination for sorting the items. The destinations can be identified by bins within the sorting equipment, or can be identified by the geographic location of the intended destination for the item. For example, the sort plan can indicate that parcels will be sorted for locations within a specific geographic region of the country. Items with intended delivery points within the specific geographic region can be sorted. The items can be sorted to bins within the processing equipment. In some embodiments, a bin may receive items intended for delivery to delivery points located in one or a subset of geographic areas within the specific geographic region.

The facility database and the address management system database 312 provides the IODP database 304 with locations of the various delivery points, including geographic identifiers for facilities and delivery points within the distribution network. For example, the address management system database 312 can store facility zip ranges, that is, a range of ZIP Codes™ serviced by, assigned to, or affiliated with a particular facility in a distribution network. The address management system database 312 can also store other location-relevant information, such as that described with regard to the placard 200.

The IODP system 300 has an application 314 that is in communication with the IODP database 304. The application 314 processes the data compiled in the IODP database 304 to generate one or more placards 200 as described herein. The application 314 is in communication with the printer 324 that prints the placard 200.

A workstation 318 is in communication with the application 314. The workstation 318 includes a computer 320 and/or a mobile computing device 322. The computer 320 and mobile computing device 322 are in communication with each other. The computer 320 and/or mobile computing device 322 can be operated by a user to interact with the application 314. The computer 320 and the mobile computing device 322 can allow an operator access to the central server 304 to perform various operations, such as, for example, to print placards 200, to update sort plans or route information, to modify information stored in the IODP database 304, or for any other desired purpose.

The IODP central server 302 and IODP database 304 are in communication with a surface visibility (SV) database 316. The SV database 316 can log data regarding placard 200 scan events, placard 200 stage events, placard 200 location, RFID data, item 220 data such as location, scan events, etc., and/or other information. The SV database 316 can maintain the location, availability, or other characteristic of transportation vehicles within the distribution network, and can include item characteristics, such as location, etc., within the distribution network The SV database 316 can maintain the location, or other characteristics, of placards 200. The SV database 316 is in communication with the processing equipment 100 and RFID reader vestibules/RFID readers described herein. Communication can be accomplished through Wi-Fi, Ethernet, Bluetooth, and/or suitable manners.

Figure 4:
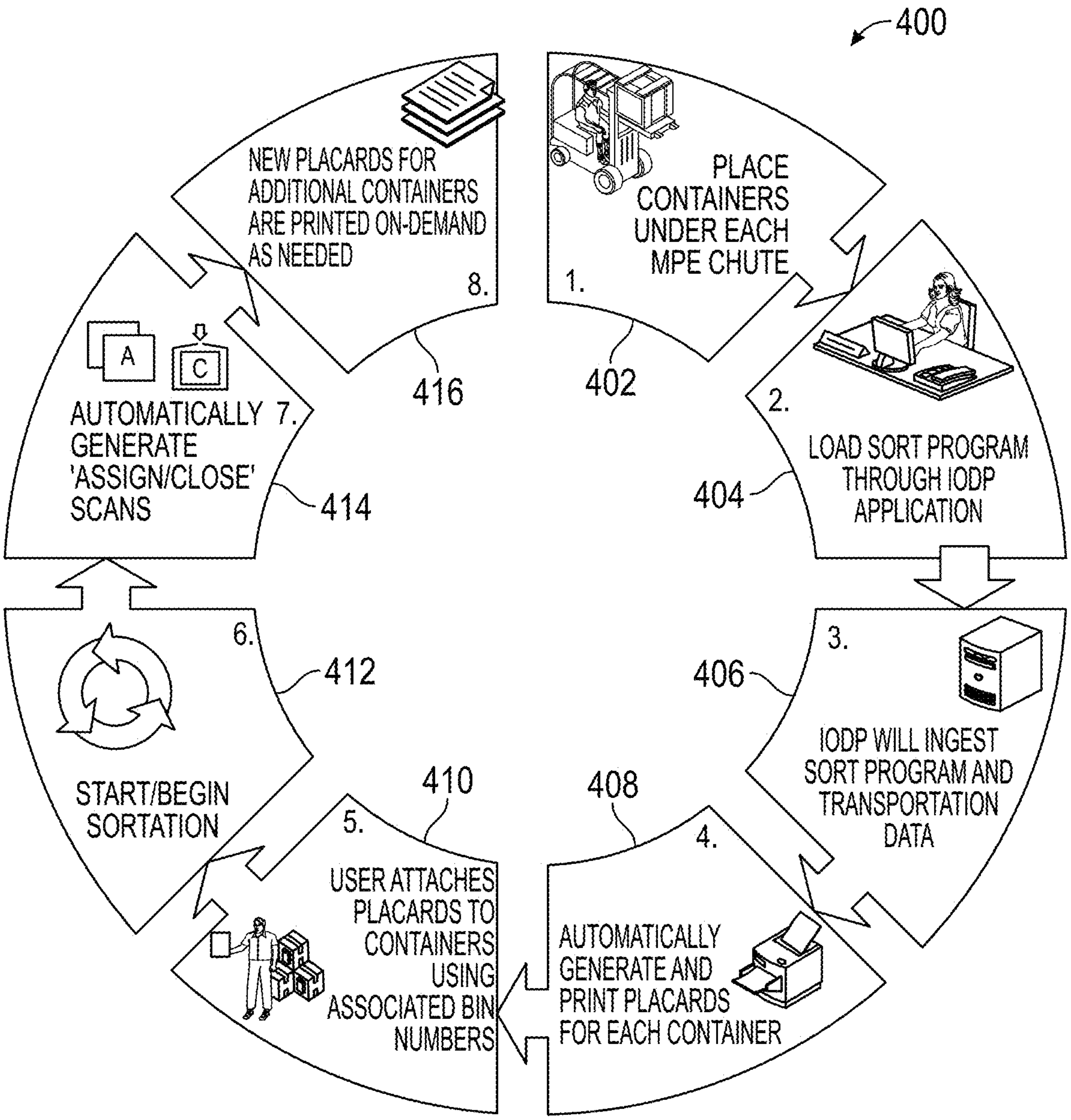
FIG. 4 schematically illustrates an exemplary IODP method.

FIG. 4 illustrates an exemplary IODP method 400. At block 402, item containers 202 are placed at each bin 106 such that items 220 sorted to bin 106 by the processing equipment 100 will be received by the item container 202. In some aspects, the processing equipment 100 has mail processing equipment (MPEs) that include chutes such that placing the item container 202 at a bin 106 positions the item container 202 under a chute. At block 404, an operator, using the workstation 318, loads a sort program from the sort program database 310 through the application 314. The sort program can be chosen based on the intended destinations for the items to be sorted, the facility at which the items are located, the origination of the items to be sorted, the equipment on which the sort program is to be run, the time of day, etc. At block 406, the IODP central server 302 processes the sort program from the sort program database 310, transportation data from the transportation database 308, facility data from the address management system database 312, and/or data from the SV database 316.

At block 408, the IODP system 300 automatically generates placards 200 using the data described above, resulting in the placards 200 being printed at the printers 202. The central server 302, using information from the various sources described, can assign a destination or a group of geographic locations to each bin 106. The central server 302 then generates the placards 200 for attaching to item containers 202 at the bins 106 in the item processing equipment 100. This advantageously ensures that the placards 200 are generated and printed using the most up-to-date information.

The IODP system 300 can print the placards 200 in an organized manner, such as by printing to a printer near or adjacent the bin 106 location for the placard 200, which can improve efficiency by eliminating time used to organize placards 200. In some embodiments, portable printers can attach to and/or be carried by an operator, such as a hip printer. This can advantageously enable an operator to print a placard 200 at any position. A placard printed from a portable printer can be smaller than a placard 200 printed by a printer that is not portable.

At block 410, an operator applies or attaches a placard 200 to the appropriate item container 202 by matching the bin number 214 on the placard 200 with the respective bin 106. At block 412, the operator commands the processing equipment 100 to begin the sortation process. The processing equipment 100 sorts items 220 to bins 106 that are associated with the destinations on the shipping labels of the items 220. The processing equipment 100 can determine the intended delivery point for each item. The intended delivery point can have a destination code, such as a ZIP Code™ therein or associated therewith.

In some embodiments, instead of or in addition to printing a placard for each item container 202, the central server 302 can identify an item container 202 by a container identifier unique to the container. For example, each item container 202 may have a computer readable code, such as a BLE or RFID tag thereon. The central server 302 can associate the item container 202 code in a record with the information on a placard 200 as described herein. In some embodiments, the item container can be assigned a tracking parcel, which can be sorted to the item container 202, and which also has a unique identifier, such as a BLE or RFID tag. The item container 202 can be associated with the unique identifier for the tracking parcel, and the tracking parcel can be associated with the information which is on a placard 200, as described herein. In some embodiments, the placard 200 need not be physically generated, but an association between the placard information and the computer readable code of the container 202 is generated and stored.

At block 414, the IODP system 300 automatically generates an assign scan that associates the placard 200 with the respective bin 106 which is communicated to the SV database 316. The assign scan is stored in the IODP database 304, and/or the surface visibility database 316, to indicate creation of the record of the item container 202. When the placard 200 is generated, the item container record 202 is generated, and includes or is associated with the information on the placard 200. The item container 202 can then be tracked throughout the distribution network and handling events for the item container 202 to be tracked. As the item processing equipment moves items 220 into the item container 202 according to the sort plan and according to the intended delivery points for the items 220, the items 220 are associated with the item container 202 into which the items 220 are sorted, or with the record of the item container 202. As handling events are recorded or detected for the item container 202, the records for the items 220 can be recorded as well.

As the item processing equipment 100 places items in the item containers 202, the item containers 202 fill up. In step 416, the item processing equipment 100 can identify when an item container 202 is filling up or is near to filling or reaching a threshold level, and can alert an operator or an automated sweeping or bin removal system. When the bin is full, or is nearing full, the IODP system 300 automatically generates a placard 200 for the next item container 202 to be placed at the bin 106 in the item processing equipment 100. When the placard 200 for the next item container 202 is generated, the central server 302 can generate, record, and/or store a close scan for the full item container 202. The central server 302 can also generate a close event for the item containers 202 in the item processing equipment 100 when sortation is complete. The "assign" event or scan and "close" event or scan are communicated to the SV database 316. Automating the "assign" and "close" events or scans can reduce operator error and allow for the improved processing of item containers 202 and items 220.

In some embodiments, operators can request new placards 200 for additional item containers 202 as needed. If an operator sees an item container 202 is full, the operator can place a new item container 202 in the bin 106, and can request a new placard. When new placards 200 are requested by operators, the central server can generate "assign" and "close" events or scans as well. In some embodiments, the IODP system 300 can automatically generate a placard 200 for a next item container 202 when the system identifies that a first container 202 has been removed from a bin 106, and the next bin has been replaced in the bin 106. This can be done using a presence sensor, weight sensor, etc.

Figure 5A:
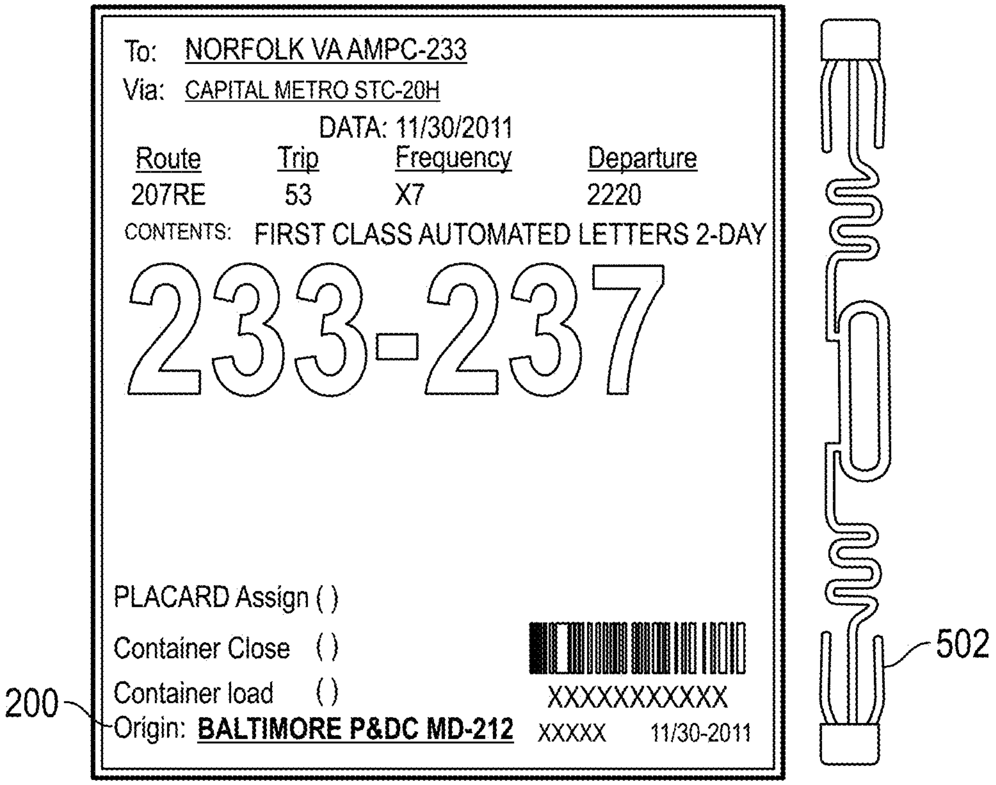
FIG. 5A illustrates an embodiment of placard having a radio-frequency identification (RFID) tag.
Figure 5B:
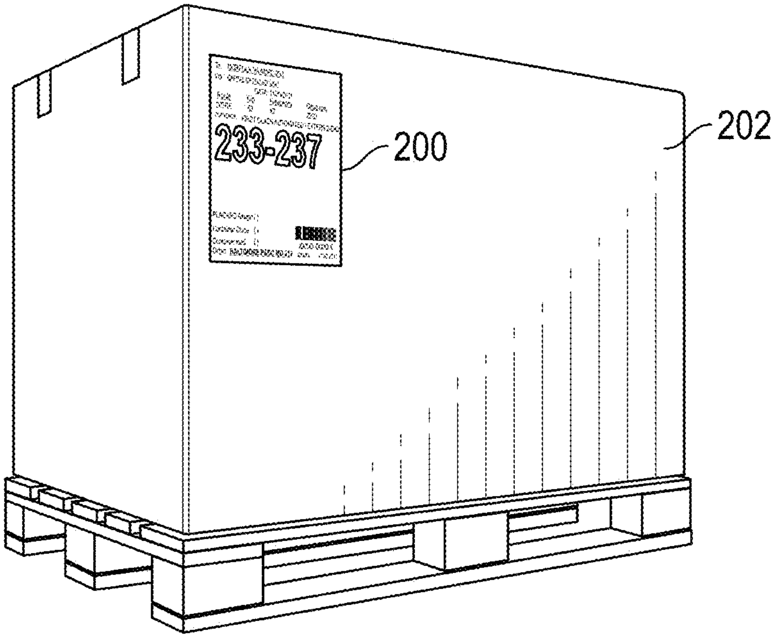
FIG. 5B illustrates the placard of FIG. 5A coupled to an item container.

FIG. 5A illustrates an embodiment of a placard 200 with a tag 502. The tag 502, which can be, for example, an RFID tag, a BLE device, or other similar wireless identifier or beacon, as described herein, can be embedded in, coupled to, and/or otherwise associated with the placard 200 such that the movement of the placard 200 can be monitored. FIG. 5B illustrates the placard 200 placed on the item container 202, such that movement of placard 200 corresponds to the movement of the item container 202 and/or items 220 in the item container 202. As described herein, when the placard 200 is generated for a bin 106, an association with a bin 106 is generated and stored. Items 220 sorted to a bin 106 are associated with the bin 106, the item container 202, and/or the placard 200. Items 220 can be directly associated with the placard 200 and/or indirectly associated with the placard 200 via the bin 106.

Figure 5C:
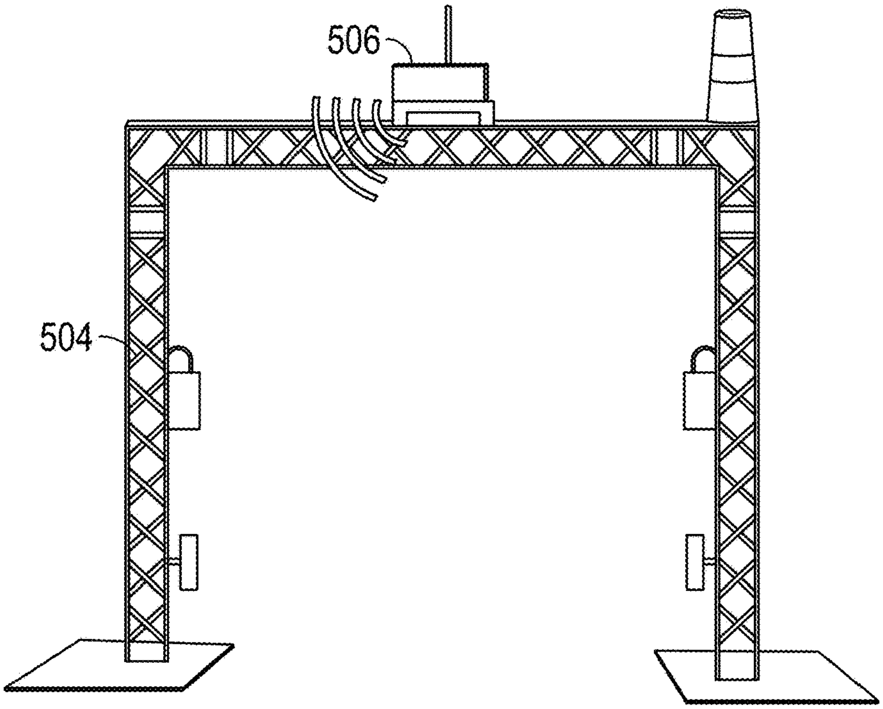
FIG. 5C illustrates an embodiment of an RFID reader vestibule with an RFID reader.
Figure 5D:
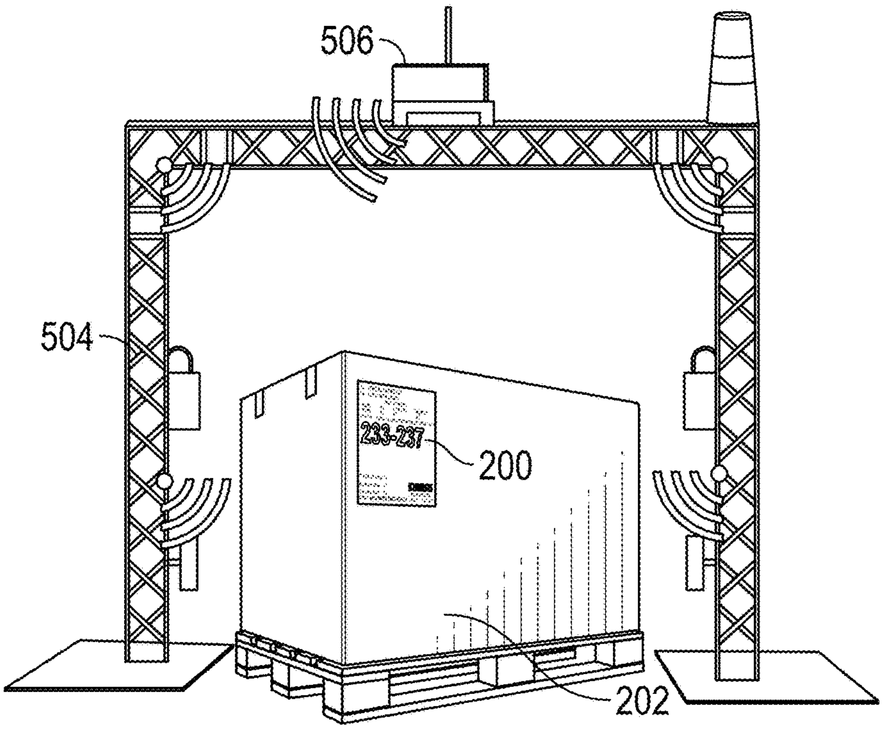
FIG. 5D illustrates the item container of FIG. 5B with the placard passing through the RFID reader vestibule.

FIG. 5C illustrates a tag reader vestibule 504 with a tag reader 506. In some aspects, the tag reader vestibule 504 has multiple tag readers 506. The tag reader vestibule 504 and/or tag reader 506, or similar devices, can be positioned along various movement routes such that the location of the placard 200 and tag 502 can be monitored, such as between the processing equipment 100 and a dock of an origin and/or destination facility, at the dock of an origin and/or destination facility, at or proximate the door of a transportation vehicle, and/or other locations. In some aspects, the tag reader vestibule 504 can be disposed between an APPS operation portion of a processing facility and a loading dock portion of a processing facility. In some aspects, the tag reader vestibule 504 can be disposed between a loading dock portion of a processing facility and one or more transportation vehicles, such as a trailer, truck, etc. In some aspects, a tag reader 506 can be coupled to one or more existing structures within a sortation facility. In some aspects, a tag reader 506 can be coupled to or proximate the door of a transportation vehicle such that the tag reader 506 recognizes when a placard 200 and tag 502 pass by the tag reader 506. The tag reader 506 can communicate with the SV database 316 to log the scan events of the tag 502 of the placard 200. In some aspects, the tag reader 506 can communicate with the IODP system 300 and/or workstation 318. Communication can be accomplished through Wi-Fi, Ethernet, Bluetooth, and/or other manners of communication. The data regarding placard 200 and tag 502 recognition that is communicated from the tag reader 506 to the SV database 316, workstation 318, and/or IODP system 300 can be logged in the SV database 316 and/or IODP database 304 such that the location of a placard 200, tag 502, and/or item 220 can be determined by referencing the SV database 316 and/or IODP database 304. FIG. 5D illustrates the item container 202 and placard 200 passing through the tag reader vestibule 504. The tag reader 506 interacts with the tag 502 of the placard 500. The tag reader 506 generates a scan event that is communicated to the workstation 318, SV database 316, and/or IODP database 304, indicating the status and/or location of the placard 200 and tag 502. The scan events can be attributed to all the items that are in the scanned container 202, and can be used for tracking containers 202 and items 220 therein. In some aspects, the RFIDs of the RFID tags 502 are stored in the IODP database 304 and/or SV database 316 such that the RFID readers 506 recognize RFIDs of scanned RFID tags 502.

Figure 6:
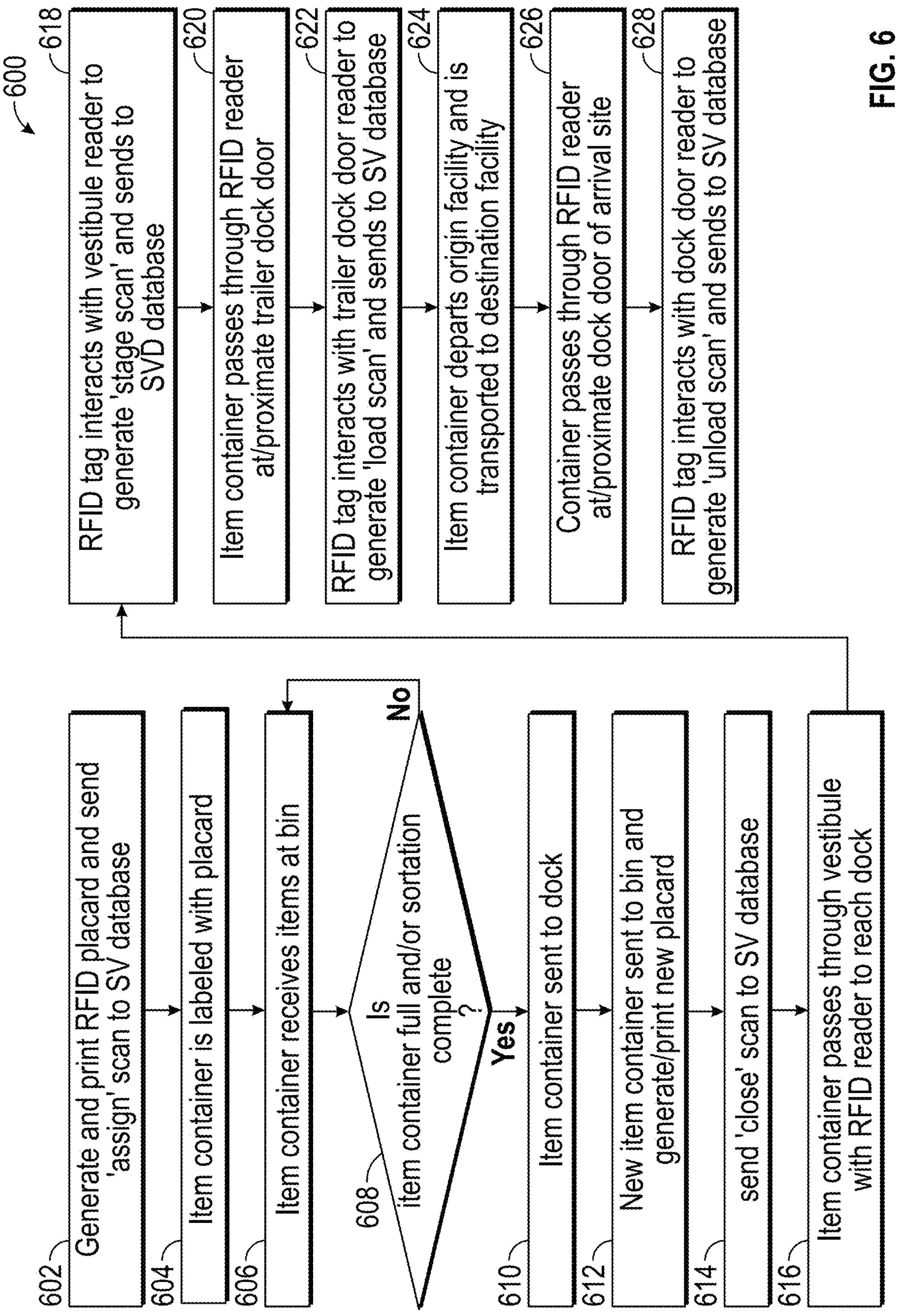
FIG. 6 illustrates an embodiment of an IODP method.

FIG. 6 illustrates an exemplary IODP method. A process 600 begins at block 602, wherein the IODP system 300 generates and prints an IODP placard 200, which, in some embodiments, is RFID enabled, and communicates an "assign" scan event to the SV database 316 and/or IODP database 304. This can be triggered by a request for a placard 200 provided via the work station 318. In some variants, this can be automatically triggered by the IODP system 300 based on data received from the placard data source system 306, workstation 318, and/or SV database 316. The "assign" scan event associates the placard 200 with a respective bin 106.

The process 600 moves to block 604, wherein item container 202 is labeled with the placard 200. The labeling can be done by an operator and/or by an automated process. In some embodiments, the labeling is accomplished by associating a unique identifier, such as in a tracking parcel or on the item container 202, with the placard information. The process 600 moves to block 606, wherein items 220 are sorted to bins 106 based on detected delivery points of the items 220. The processing equipment 100 scans items and moves the items into the item containers 202 positioned at the respective bins 106. The items 220 are associated with the bin 106 which is associated with the placard 200, effectively associating the items 220 to the placard 200 and/or tag 502. In some aspects, the items 220 are directly associated with the placard 200 and/or tag 502.

The process 600 moves to decision state 608, wherein the processing equipment 100, which can include cameras or sensors, determines if the item container 202 is full or if processing is complete. If the item container 202 is not full and sortation is not complete, the process 600 returns to block 606, wherein the item container 202 continues to receive items 220. If the item container 202 is full or sortation is complete, the process 600 moves to block 610, wherein the item container 202 is removed from the bin 106, and is sent to a location for further processing. In some embodiments, the item container is sent to the dock for shipment to another facility.

The process moves to block 612, wherein a new item container 202 is sent to the empty bin 106 and the IODP system 300 generates/prints a new placard 200. The process 600 moves to block 614, wherein the IODP system 300 sends a "close" scan to the SV database 316 and/or IODP database 304 (which can be via the workstation 318), indicating that the bin 106 with items 220 therein associated with the placard 200 is closed, and no more items 220 can be added to or associated with the container 202.

The process 600 moves to block 616, wherein the full item container 202 with the placard 200 is maneuvered by an operator and/or an automated vehicle through the tag reader vestibule 504 with the tag reader 506 to reach the dock. The process 600 moves to block 618, wherein the tag 502 of the placard 200 interacts with the tag reader 506 to generate a "stage scan" that is communicated to the SV database 316 and/or IODP database 304 (which can be via the workstation 318), indicating that the container 202 having the placard 200 thereon has been staged. In some embodiments, a tag such as a tag on the item container 202 or a tag in a tracking parcel within the item container 202 is read by the tag reader 506, for example, if a physical placard is not being used.

In some embodiments the IODP system 300 determines a type of scan event for the container 202 based on a previous scan event. For example, a vestibule tag reader 506 may not know which direction the item container 202 is moving through the vestibule. If a tag reader 506 is located at a transition point between a processing area and a loading area, the tag reader 506 may not be able to determine whether the next scan event based on reading the tag on the item container should be a stage scan event, meaning the item container 202 is moving from the processing area to the dock and is ready for loading onto a truck at the dock, or if the item container 202 is being unloaded from a truck and is being moved to a processing area for processing. The IODP system 300 can determine what type of scan event should be associated with reading a tag based on the prior scan event. For example, if the prior scan event for an item container was a "closed" scan event, and then the dock tag reader 506 detects the tag, the prior closed scan event indicates that the item container was last at a processing machine, and is therefore moving to the dock to be staged for loading. In this case, the correct type of scan event is a "stage" scan event. If an item container 202 and a tag thereon moves through a tag reader 506 around a loading dock door, the IODP system 300 determines the prior scan event. If the scan event was a "loaded" scan event, indicating that the item container was loaded onto a vehicle, then the IODP system 300 identifies the scan event from the tag reader 506 as an "unload" scan event. If the prior scan event for the item container was a "stage" scan event, then the IODP system 300 identifies the scan at the loading dock door as a "load" event, as the item container 202 is being loaded on a vehicle for transport.

The process moves to block 620, wherein the item container 202 is maneuvered by the operator and/or an automated vehicle through/by the tag reader 506 at/proximate the trailer dock door or loading door. The process 600 moves to block 622, wherein the tag 502 interacts with the tag reader 506 at or proximate the dock door of the origin facility or trailer door to generate a "load" scan event that is communicated to the SV database 316 and/or IODP database 304 (which can be via the workstation 318).

The process 600 moves to block 624, wherein the item container 202 departs the origin facility and is transported to the destination facility. An in transit or other similar event can be logged when the vehicle on which the item container is located leaves the facility. The process moves to block 626, wherein the item container 202 passes through/by the tag reader 506 at/proximate the dock door of the arrival facility or trailer door. The process 600 moves to block 628, wherein the tag 502 of the placard 200 interacts with the tag reader 506 at the dock door reader to generate an "unload" scan that is communicated to the SV database 316 and/or IODP database 304 (which can be via the workstation 318). Upon each interaction of the tag 502 with the tag reader 506, a scan event or handling event can be recorded. The scan event or handling event can be recorded for each item within the item container 202. This can eliminate the need for a manual scan or an operator scan of item containers 202 as they move within the facility and between facilities.

Figure 7:
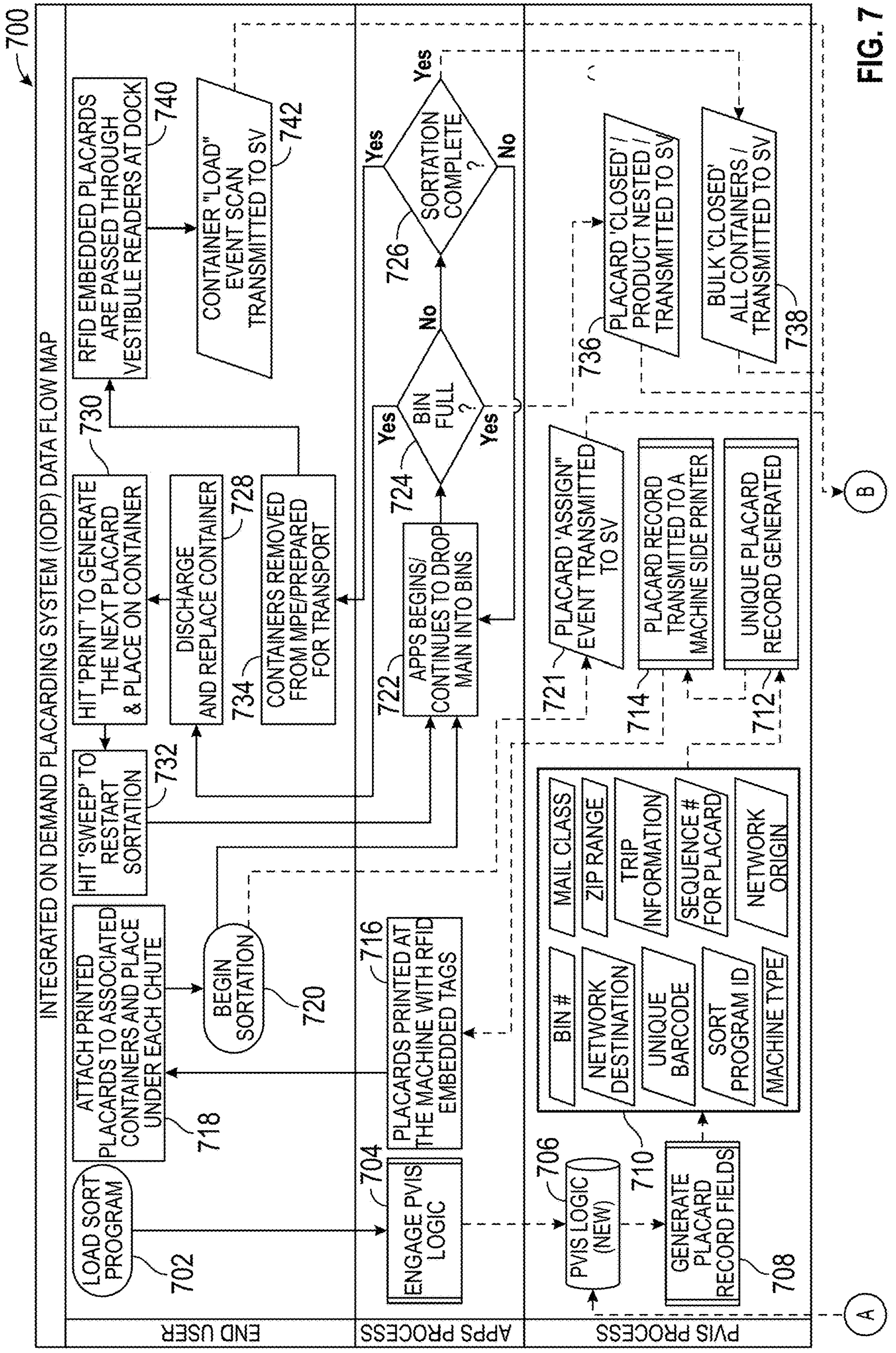
FIG. 7 illustrates an embodiment of an IODP data flow map
Figure 7:
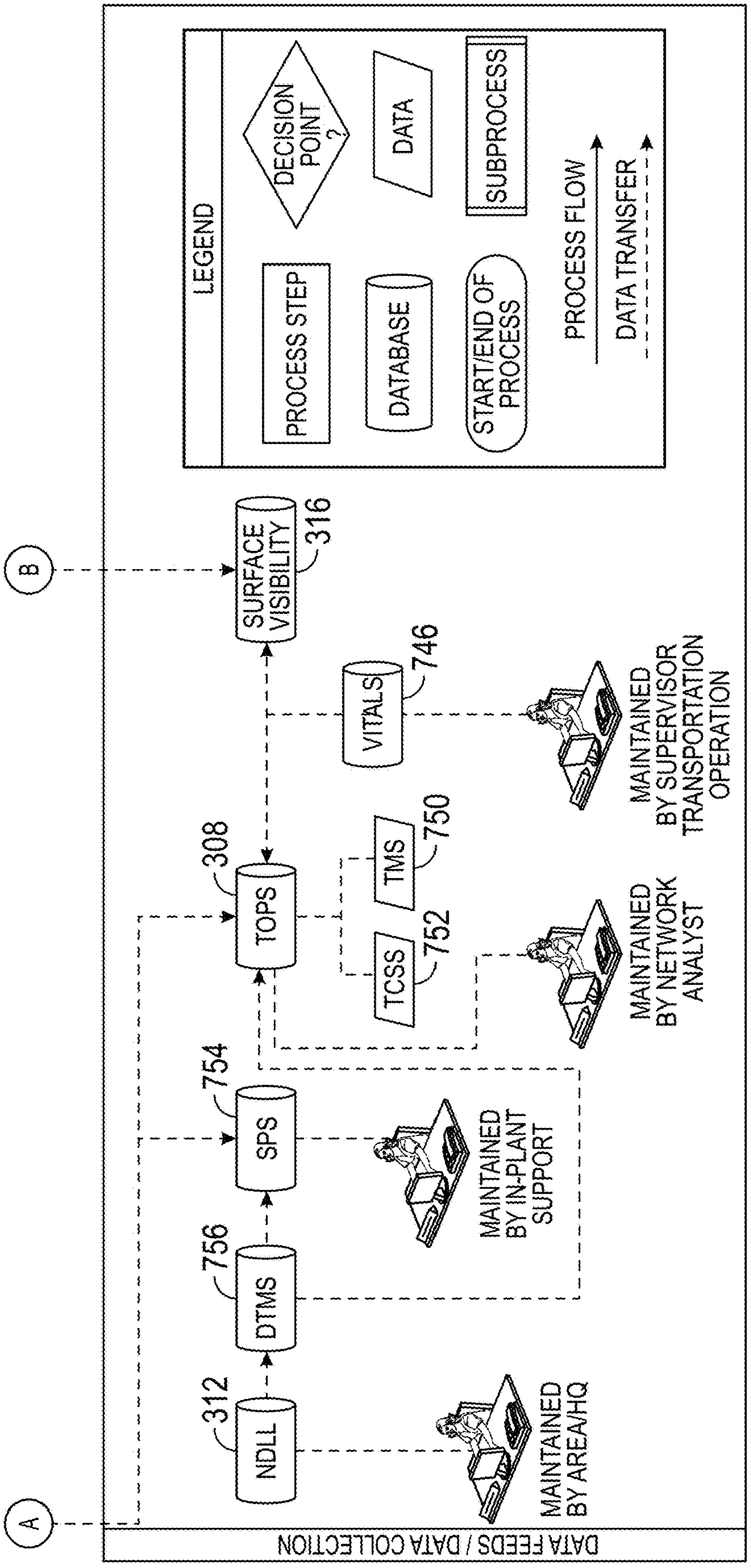

FIG. 7 illustrates an IODP data flow map 700. At block 702, an operator, using the workstation 318, loads a sort program from the sort program database 310 through the application 314. At block 704, the sort machine 100 engages the logic of the IODP system 300, such as the application 314. At block 706, the IODP database 304 of the IODP system 300 receives data from a plurality of databases, such as the transportation database 308 a surface visibility database, a sort plan system (SPS) database 754 and/or other databases. The SPS database 754 can contain information on sort plans, and can contain sort plans for one or more pieces of processing equipment at one or more facilities. The SPS database 754 can be maintained by in-facility support operators and receive data from a distribution table maintenance system (DTMS) database 756 and the address management system database 312, which can be maintained by area or regional support operators. The transportation database 308, which can be maintained by network analysts, can receive data from the DTMS database 756, vehicle information transportation analysis and logistics (VITAL) database 746, and SV database 316. The transportation database 308 can also receive transportation contract support system (TCSS) data 752 and transportation management system (TMS) data 750. The TCSS data can include information regarding carriers, vehicles and other systems which are contracted by the distribution network to transport items and item containers 202. At block 708, the IODP system 300 generates placard record fields, which can include the record fields outlined at block 710 or described elsewhere herein, which can include at least a bin number, item class/category, network destination, delivery code range, such as ZIP Codes™, barcode, trip information, sort program ID, sequence number for placard, network origin, machine type, and/or other data described herein. At block 712, the IODP system 300, using data aggregated in the IODP database 304, generates unique electronic placards records, populating the data fields outlined in block 710. At block 714, the IODP system 300 transmits the placard record to a printer 324. At block 716, the printer 324 prints the placard 200. In some embodiments, the placard 200 is printed with a tag 502 embedded or otherwise coupled/associated with the placard 200. The printer 324 can be positioned proximate the bin 106 for convenient placard 200 retrieval. In some embodiments, the printer 324 can be portably carried by an operator, which can include being a hip printer, enabling the operator to print a placard 200 at any location. The placard 200 can be varying sizes, which can include being a reduced size when printed from a portable printer 324. At block 718, the operator couples the printed placards 200 to an item container 202 located at the bin 106 indicated on the placard 200, such that the placard 200 moves with the item container 202 and the items 220 contained in the item container 202. In some aspects, an automated vehicle and/or robot couple or otherwise apply the placard 200 to the item container 202 at the respective bin 106. In some embodiments, attaching placards to associated containers can include associating a code for the container with the electronic placard record without printing a physical placard. The code for the container can be a passive or active tag, such as RFID tag, BLE device, etc. The bin 106 and item container 202 can be positioned under a chute of the MPE that is part of the processing equipment 100.

At block 720, the processing equipment 100 begins sortation. At block 722, the processing equipment 100 begins/continues to sort items 220 to bins 106 and into item containers 202 according to item information read from or the items 220 or tags or labels thereof, as the items 220 are sorted. At block 721, the IODP system 300 generates an "assign" event for each placard 200, assigning the placard 200 to the bin 106, which is transmitted to the SV database 316. The SV database 316 can in turn transmit data, including events, to the IODP database 304. The placard 200 is assigned to the bin 106 such that the items 220 sorted to the bin 106 are indirectly associated with the placard 200 and/or tag 502. In some aspects, the items 200 are directly associated with the placard 200 and/or tag 502.

At block 724, the processing equipment 100 determines if the bin 106, i.e. the item container 202, is full. This can be accomplished with cameras or sensors. In some embodiments, the IODP system 300 can determine an item container 202 is full or nearing capacity by counting the number of items 220 which have been sorted to the item container 202. In some embodiments, the IODP system 300 can retrieve size and weight information for the items 220 from an item information database. The IODP system can use the size and weight information to determine whether the item container 202 is full, nearly full, or at or reaching capacity. If the bin 106 is not full, the processing equipment 100 determines if sortation is complete at block 726. If the bin 106 is full, the IODP system 300, at block 736, generates a "closed" event, resulting in the items 220 being electronically nested in the item container 202 and/or associated with the placard 200 and/or tag 502 as described herein, and transmits the "closed" event to the SV database 316. The SV database 316 can, in turn transmit data to the IODP database 304. If the bin 106 is full, the operator or an automatic sweeper/vehicle/robot discharges the item container 202 and replaces it with a new item container 2020 at block 728. At block 730, the operator prints a new placard 200 and couples it to the new item container 202. In some embodiments, the new placard 200 can be generated and be waiting at the placard printer when the item container 202 is filled, or when it is removed, or replaced. At block 732, the operator interfaces with the workstation 318 to command the processing machine to "restart" operation. In some embodiments, the IODP system 300 can estimate, based on item information for the items 220 being sorted and their destinations, a number of placards 200 required to complete the sort run, and the bins 106 at which the placards will be needed. The placards 200 can be generated at the beginning of the run, and can be staged near the bins where they will be used in preparation for attaching them to item containers 202.

If the processing equipment 100 determines that sortation is not complete at block 726, the processing equipment 100 continues to sort items 220 to bins 106. If the processing equipment 100 determines that sortation is complete, the IODP system 300 generates a bulk "closed" event for all placards 200, resulting in the items 220 being nested or associated with the placard 200 and/or tag 502 as described herein, and transmits the "closed" events to the SV database 316. If the processing equipment 100 determines that sortation is complete, the operator and/or automatic vehicle/robot removes item containers 202 from the bins 106, prepares the item containers 202 for transportation, and transports the item containers 202 to the dock of the origin facility, as indicated at block 734. At block 740, the operator or automatic vehicle/robot maneuvers the item containers 202, with the placard 200 embedded with a tag 502, through an tag reader vestibule 504 with a tag reader 506 at or proximate the dock of the origin facility. At block 742, the tag reader 506 interacts with the tag 502, generating a "load" event scan that is transmitted to the SV database 316 that indicates the placard 200, tag 502, and/or associated items 220 passed the tag reader 506, which can indicate that the items 220, item container 202, and/or placard 200 with tag 502 have been loaded onto a transportation vehicle.

Figure 8:
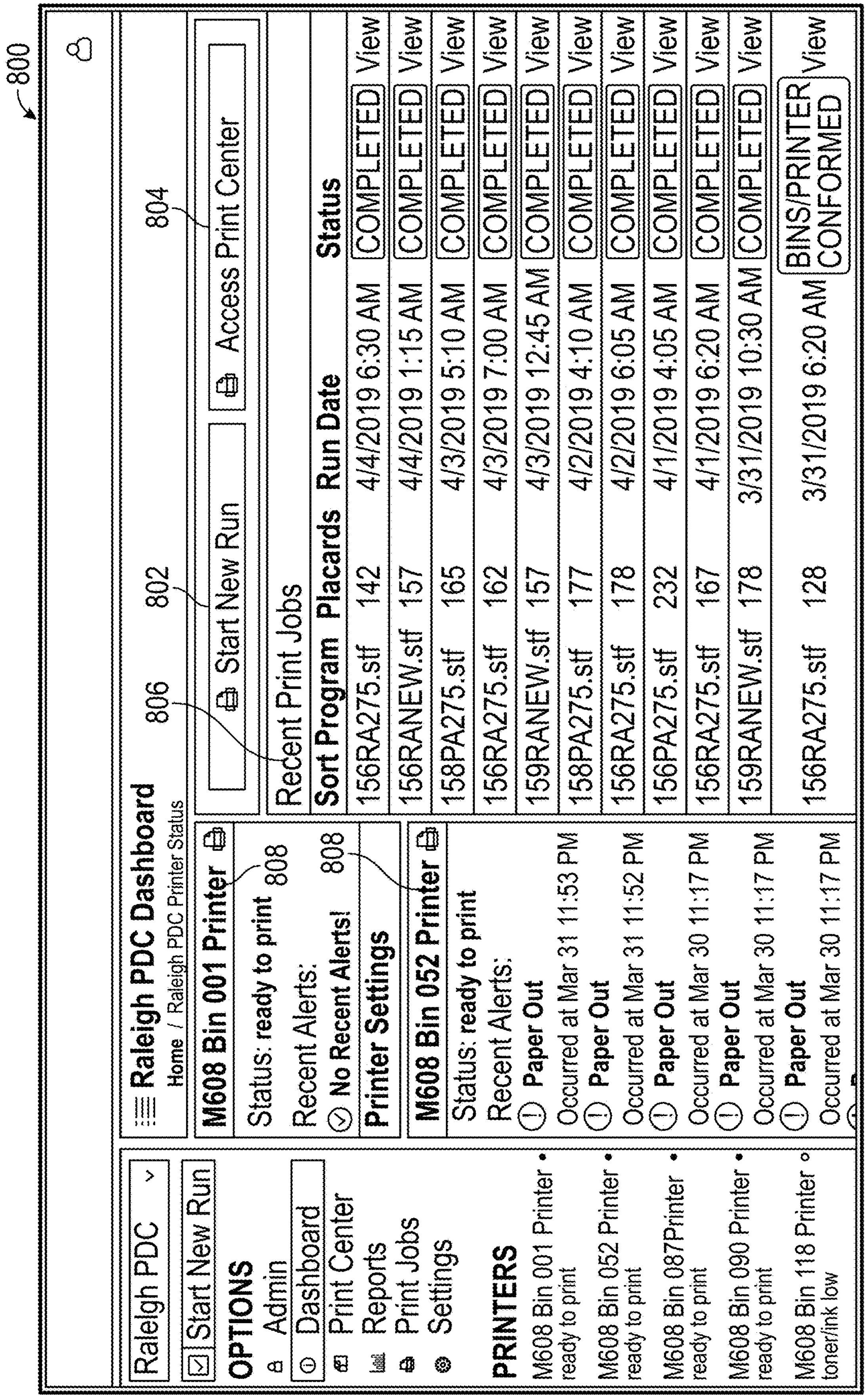
FIG. 8 illustrates an embodiment of a data center dashboard.

FIG. 8 illustrates a postal data center (PDC) dashboard 800. The PDC dashboard 800 is a user interface, which, in some embodiments, can be part of the application 314. The PDC dashboard can provide an overview of sortation jobs, placards, printers, etc., for facility operators. The PDC dashboard 800 includes a start new run button 802 that an operator may click to begin generating/printing placards 200 for a particular piece of processing equipment. The PDC dashboard 800 includes an access print center button 804 that an operator may click to access IODP printers associated with the piece of item processing equipment. The PDC dashboard 800 includes a recent print job table 806 that details previous placard print jobs run, including information such as sort program, placards printed, run date and time, status of the print job, and a link to view the placards printed. The PDC dashboard 800 includes a printer status notification viewer 808 that indicates printer 324 statuses for printers associated with the item processing equipment.

Figure 9:
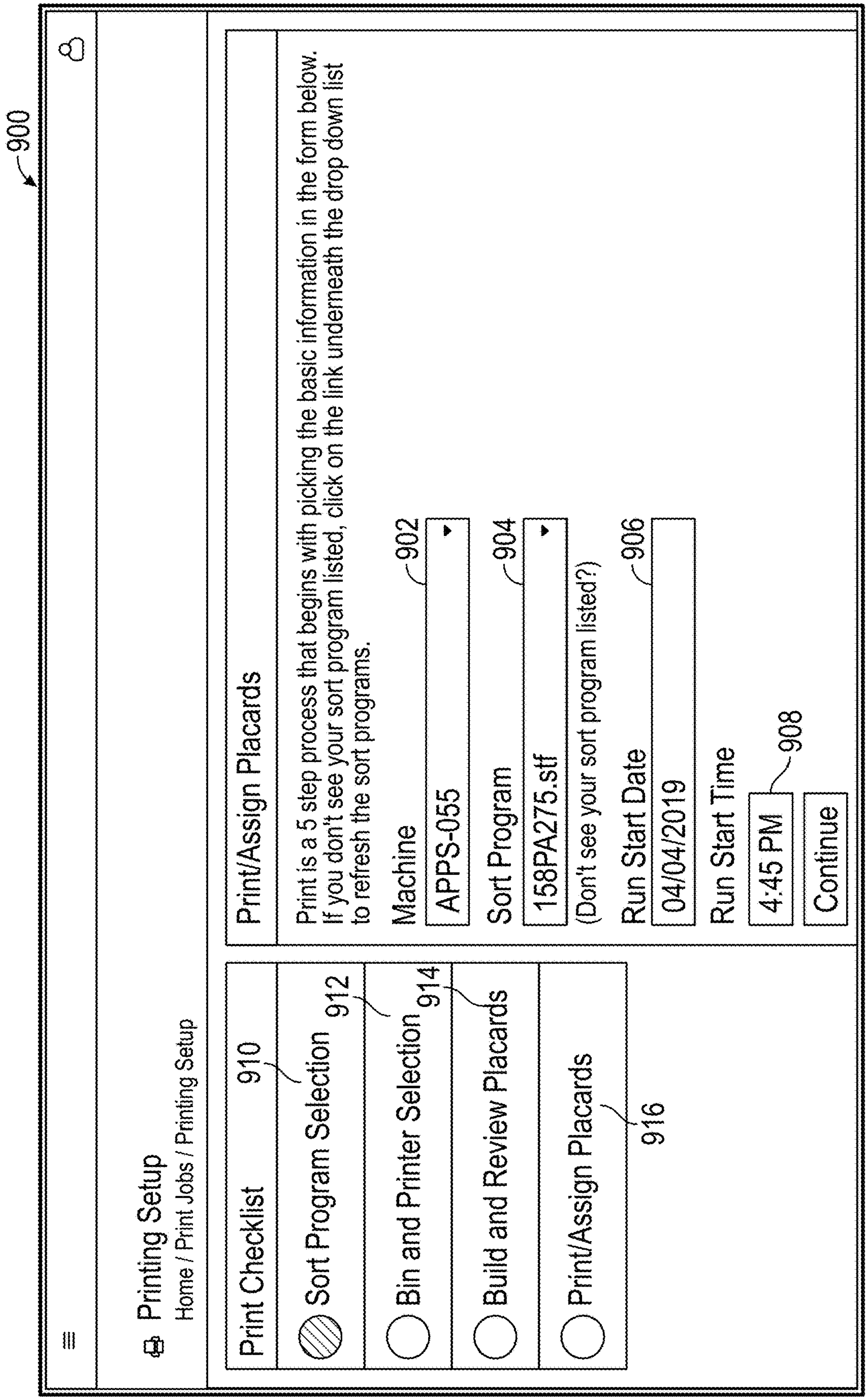
FIG. 9 illustrates an embodiment of a printing setup user interface.

FIG. 9 illustrates a printing setup user (PSU) interface 900. The PSU interface 900 can be part of the user interface of the application 314. The PSU interface 900 includes a number of buttons to navigate through different pages, including a sort program selection button 910, bin and printer selection button 912, build and review placards button 914, and print/assign placards button 916. As illustrated in FIG. 9, the sort program selection button 910, once selected, navigates to a page of the PSU interface 900 that enables a user to make sort program selections. The PSU interface 900 includes a sort machine selection drop list 902 that enables an operator to select the desired item processing equipment 100. The PSU interface 900 includes a sort program drop list 904 that can include sort programs from the sort program database 310 that enables an operator to select the desired sort program. The PSU interface 900 includes a run start date field 906 that enables an operator to input a run start date. The PSU interface 900 includes a run start time field 908 that enables an operator to input a run start time. In some embodiments, the operator can select to print a number of placards 200 as desired, or the PSU interface 900 can indicate an estimate of how many placards will be needed for the sort program, and the operator can print the estimated number of placards 200 for the sort program or some subset thereof.

Figure 10:
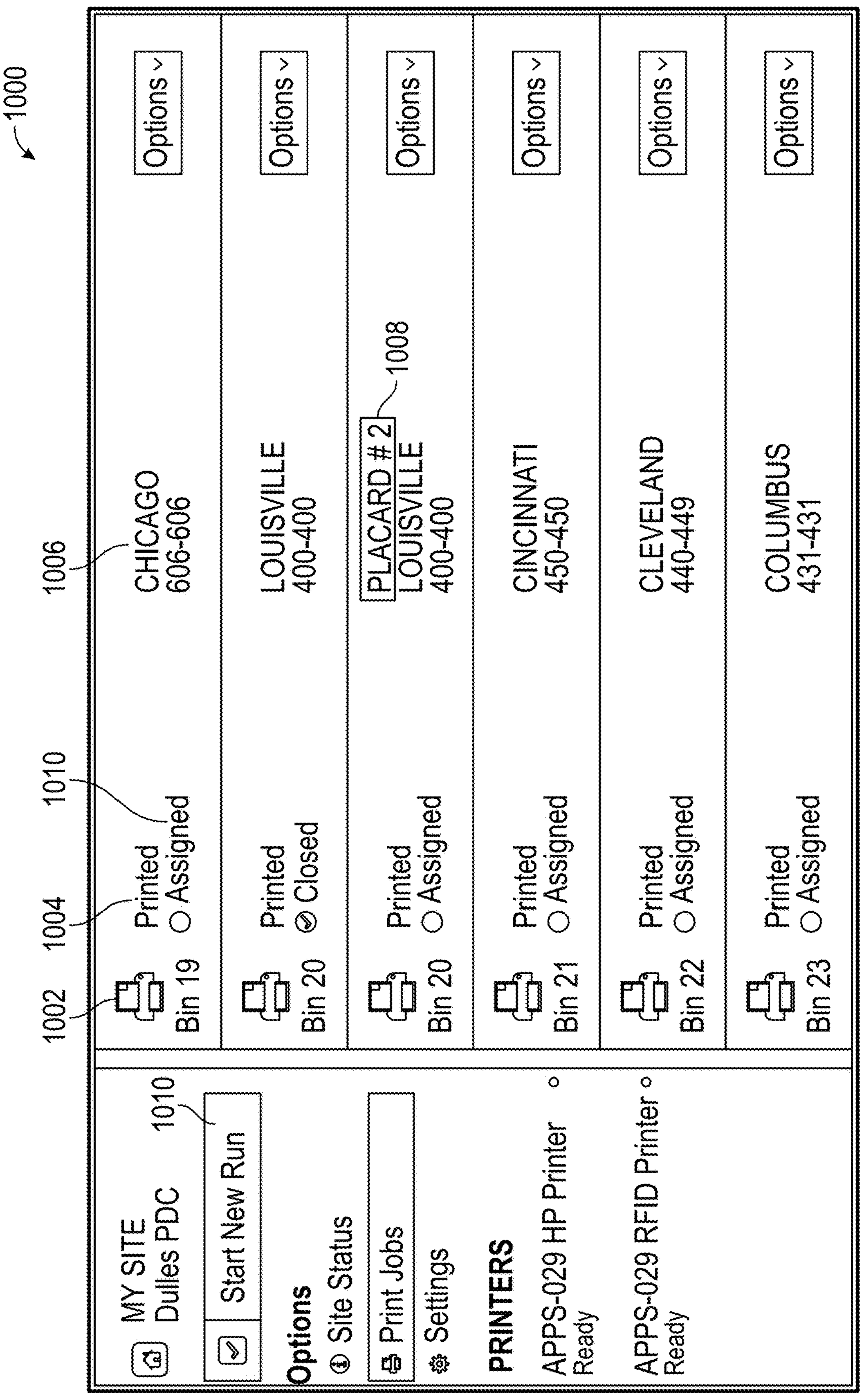
FIG. 10 illustrates an embodiment of a print job dashboard.

FIG. 10 illustrates a print job dashboard 1000. The print job dashboard 1000 can be part of the user interface of the application 314. The print job dashboard 1000 shows the status of placard print jobs for bins 106 assigned to the item processing equipment 100. For example, the print job dashboard 1000 displays a bin number 1002 (Bin 19), print status 1004 (i.e. printed/not printed), scan event status 1010 (i.e. assigned, closed, etc.), destination information 1006 (destination city, ZIP Code™, and/or ZIP Code™ ranges), and/or placard number 1008 (indicating if more than one placard has been printed for a given bin number 1002). The print job dashboard 100 includes a start new run button 1010 to begin the process of generating/printing a new run of placards 200.

Figure 11:
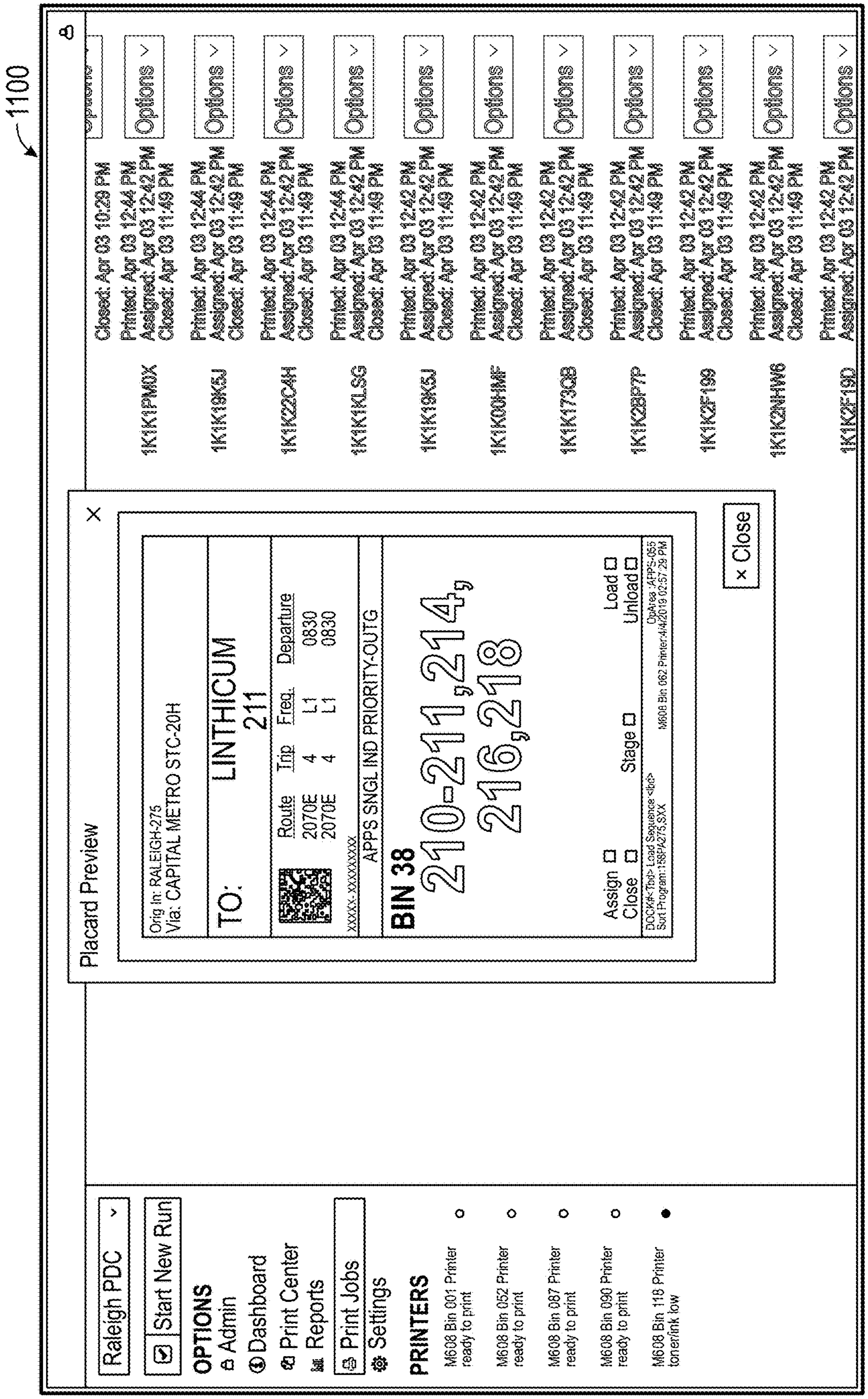
FIG. 11 illustrates an embodiment of a placard preview.

FIG. 11 illustrates a placard preview 1100. The placard preview 1100 displays an electronic preview of a placard 200, which includes the information specified in reference to the description of placard 200 herein. An operator can preview a placard before printing and/or review a placard that has already been printed by clicking on, selecting, or hovering over a placard 200 from the print job dashboard 1000.

Figure 12A:
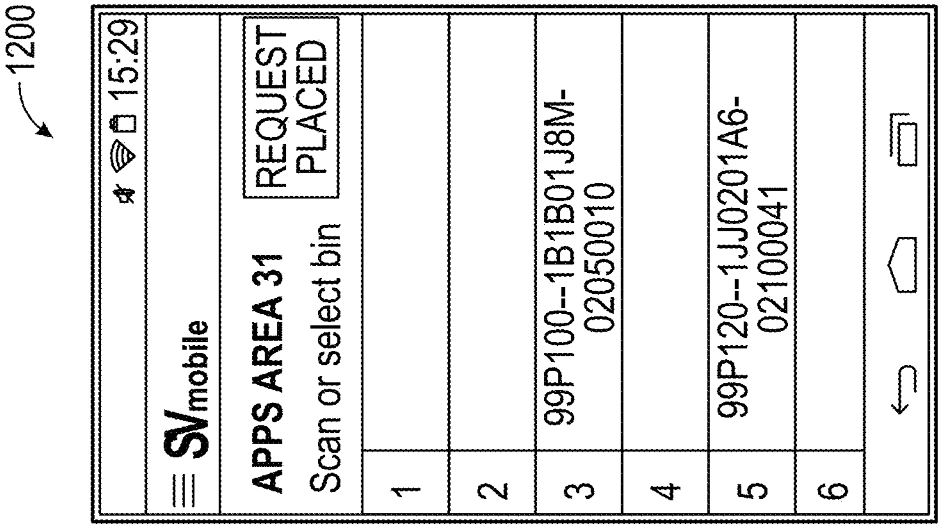
FIG. 12A illustrates an embodiment of a bin selection user interface.
Figure 12B:
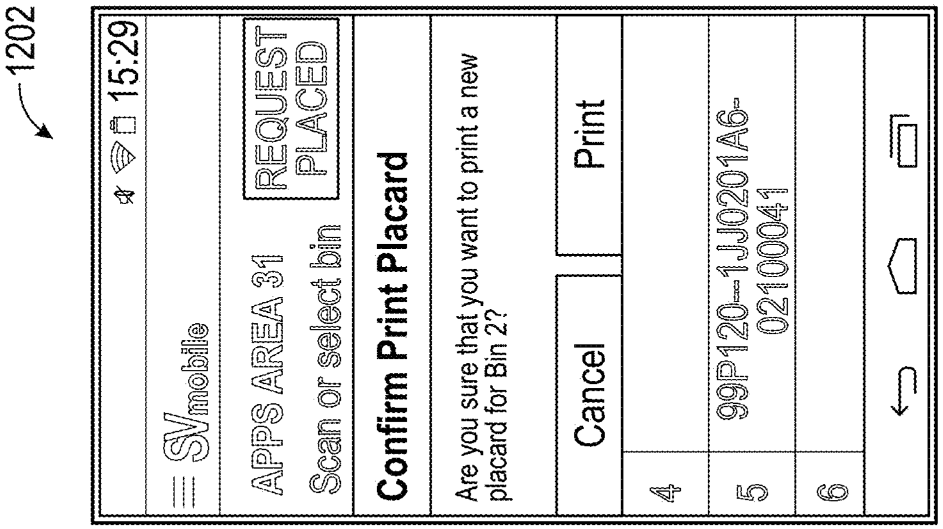
FIG. 12B illustrates an embodiment of a print placard confirmation prompt.
Figure 12C:
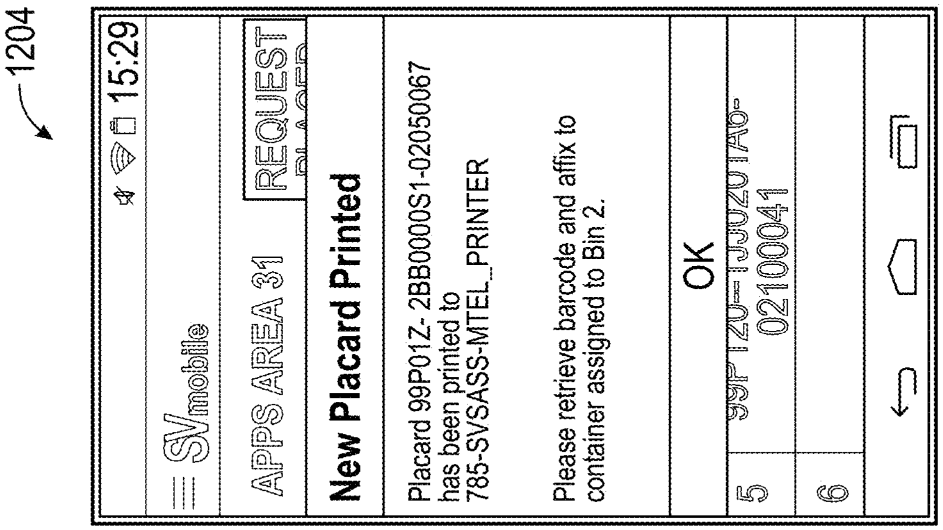
FIG. 12C illustrates an embodiment of a placard print status prompt.

FIGS. 12A-C illustrate user interfaces for the SV portable device 322 described herein. FIG. 12A illustrates a bin selection user interface 1200. The operator can select or scan a bin 106 and request a placard. Once a bin 106 has been scanned/selected and the operator has requested a placard, a print placard confirmation prompt 1202 is displayed by the SV portable device 322 that prompts the operator to select to print a placard for the selected/scanned bin or cancel as shown in FIG. 12B. If the operator selects to print a new placard, a placard print status prompt 1204 is displayed by the SV portable device 322 as shown in FIG. 12C. The placard print status prompt 1204 displays the placard number printed, the printer where the placard number was printed, instructs the operator to retrieve the printed placard 200 and couple it to the respective bin 106, and prompts the operator to select "okay."

Operator actions described herein, such as moving an item container 202 or coupling a placard 200 to an item container 202, can be performed by an automated vehicle or robot.

The foregoing description details certain embodiments of the systems, devices, and methods disclosed herein. It will be appreciated, however, that no matter how detailed the foregoing appears in text, the systems, devices, and methods may be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment may be included with other depicted embodiments in any combination. For example, any of the various components described herein and/or depicted in the Figures may be combined, interchanged or excluded from other embodiments.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open"

terms (e.g., the term “including” should be interpreted as “including but not limited to,” the term “having” should be interpreted as “having at least,” the term “includes” should be interpreted as “includes but is not limited to,” etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases “at least one” and “one or more” to introduce claim recitations. However, the use of such phrases should not be construed to imply that the introduction of a claim recitation by the indefinite articles “a” or “an” limits any particular claim containing such introduced claim recitation to embodiments containing only one such recitation, even when the same claim includes the introductory phrases “one or more” or “at least one” and indefinite articles such as “a” or “an” (e.g., “a” and/or “an” should typically be interpreted to mean “at least one” or “one or more”); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of “two recitations,” without other modifiers, typically means at least two recitations, or two or more recitations).

Furthermore, in those instances where a convention analogous to “at least one of A, B, and C, etc.” is used, in general such a construction is intended in the sense one having skill in the art would understand the convention (e.g., “a system having at least one of A, B, and C” would include but not be limited to systems that have A alone, B alone, C alone, A and B together, A and C together, B and C together, and/or A, B, and C together, etc.). In those instances where a convention analogous to “at least one of A, B, or C, etc.” is used, in general such a construction is intended in the sense one having skill in the art would understand the convention (e.g., “a system having at least one of A, B, or C” would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase “A or B” will be understood to include the possibilities of “A” or “B” or “A and B.”

The term “comprising” as used herein is synonymous with “including,” “containing,” or “characterized by,” and is inclusive or open-ended and does not exclude additional, unrecited elements or method steps.

All numbers expressing quantities of ingredients, reaction conditions, and so forth used in the specification and claims are to be understood as being modified in all instances by the term “about.” Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

The above description discloses several methods and materials of the present disclosure. This disclosure is susceptible to modifications in the methods and materials, as well as alterations in the fabrication methods and equipment. Such modifications will become apparent to those skilled in the art from a consideration of this disclosure or practice of the development disclosed herein. Consequently, it is not intended that this disclosure be limited to the specific embodiments disclosed herein, but that it cover all modifications and alternatives coming within the true scope and spirit of the disclosure as embodied in the attached claims.

While the above detailed description has shown, described, and pointed out novel features of the improvements as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A method of tracking items in a distribution network, the method comprising:

generating a first placard, wherein the first placard comprises a first computer readable code;

determining, in one or more processors, that a first plurality of items have been sorted to a disposition location of an item processing machine;

associating, in the one or more processors, the first placard and the first plurality of items;

storing, in a memory, the association of the first placard and the first plurality of items;

generating a scan event based on the first computer readable code of the first placard interacting with a reader;

storing, in the memory, the scan event for the first placard and each of the first plurality of items associated with the first placard;

in response to determining that the first plurality of items have been sorted to the disposition location of the item processing machine, generating a second placard comprising a second computer readable code;

determining, in one or more processors, that a second plurality of items have been sorted to the disposition location of the item processing machine;

associating, in the one or more processors, the second placard and the second plurality of items; and storing, in the memory, the association of the second placard and the second plurality of items.

2. The method of claim 1, wherein the scan event is a first scan event, and further comprising:

generating a second scan event based on the second computer readable code of the second placard interacting with the reader; and storing, in the memory, the second scan event for the second placard and the second plurality of items associated with the second placard.

3. The method of claim 1, further comprising:

generating a load scan event based on the first computer readable code of the first placard interacting with another reader of a portal as the first placard passes through the portal to a transportation vehicle, indicating that the first plurality of items been loaded onto the transportation vehicle at a first facility.

4. The method of claim 3, further comprising:

generating an unload scan event based on the first computer readable code of the first placard interacting with an additional reader as the first placard is maneuvered from the transportation vehicle, indicating that the first plurality of items associated with the first placard have been unloaded from the transportation vehicle at a second facility.

5. The method of claim 1, wherein the first computer readable code of the first placard comprises a unique identifier, and wherein the method further comprises updating, in an item database, item records for each of the first plurality of items sorted to the disposition location to include the unique identifier of the first computer readable code of the first placard.

6. The method of claim 1, wherein the first placard comprises unique identifying information, origin facility information, and destination information.

7. The method of claim 1, wherein an item container is disposed at the disposition location.

8. The method of claim 7, further comprising associating, in the memory, the first placard with the item container.

9. The method of claim 1, wherein the first computer readable code comprises a radio-frequency identification (RFID) tag.

10. The method of claim 1, wherein the scan event comprises a close event.

11. A method of tracking distribution items, the method comprising:

creating, via one or more processors, placard information for a disposition location, the placard information comprising a computer readable code and destination information;

generating an event when a plurality of items have been sorted to the disposition location;

associating, in a memory, the computer readable code of the placard information with each of the plurality of items sorted to the disposition location;

associating the event with the plurality of items;

generating a scan event based on the computer readable code interacting with a reader;

querying the memory to identify the destination information based on the scan event;

directing the plurality of items to a destination within a distribution facility according to the destination information; and generating a load scan event based on the computer readable code of the placard information interacting with another reader of a portal as the computer readable code passes through the portal to a transportation vehicle, indicating that the plurality of items been loaded onto the transportation vehicle at the distribution facility.

12. The method of claim 11, wherein the event is a close event.

13. The method of claim 11, wherein the computer readable code comprises a radio-frequency identification (RFID) tag.

14. A system of tracking items in a distribution network, the system comprising:

a vestibule comprising a reader positioned at a location in a distribution facility; and one or more processors in communication with an item processing machine, the item processing machine comprising a plurality of disposition locations, the item processing machine configured to sort items to one of the plurality of disposition locations, the one or more processors configured to:

generate a placard, wherein the placard comprises a computer readable code;

receive an indication that the items have been sorted to the one of the plurality of disposition locations;

associate, in the one or more processors, the placard and each of the items sorted to the one of the plurality of disposition locations;

storing, in a memory, the association of the placard and each of the sorted items;

detect the computer readable code of the placard moving through the vestibule;

generate a scan event based on the detection;

identify the location of the vestibule within the distribution facility; and store, in the memory, a type of the scan event for each of the sorted items, the type of the scan event being based on the identified location of the vestibule within the distribution facility.

15. The system of claim 14, wherein the placard comprises destination information.

16. The system of claim 14, wherein the vestibule is located at a transition between a processing area and a dock area of the distribution facility, and wherein the type of the scan event is a stage scan event.

17. The system of claim 14, wherein the computer readable code comprises a radio-frequency identification (RFID) tag.

18. The system of claim 14, wherein the one or more processors are configured to receive the indication that the items planned to be sorted to the one of the plurality of disposition locations have been sorted when a sortation of the items is complete.

* * * * *